(12) United States Patent
Lam et al.

(10) Patent No.: US 11,303,571 B2
(45) Date of Patent: Apr. 12, 2022

(54) DATA COMMUNICATION METHOD AND DATA COMMUNICATIONS NETWORK

(71) Applicant: Huawei Technologies Co., Ltd., Guangdong (CN)

(72) Inventors: Wan Lam, Shenzhen (CN); Hui Lu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 44 days.

(21) Appl. No.: 16/750,983

(22) Filed: Jan. 23, 2020

(65) Prior Publication Data

US 2020/0162388 A1 May 21, 2020

Related U.S. Application Data

(63) Continuation of application No. PCT/CN2018/097230, filed on Jul. 26, 2018.

(30) Foreign Application Priority Data

Aug. 1, 2017 (CN) .......................... 201710648283.4

(51) Int. Cl.
*H04L 12/803* (2013.01)
*H04L 47/125* (2022.01)
*H04L 45/00* (2022.01)
*H04L 47/34* (2022.01)

(52) U.S. Cl.
CPC ............ *H04L 47/125* (2013.01); *H04L 45/04* (2013.01); *H04L 47/34* (2013.01)

(58) Field of Classification Search
CPC ....... H04L 47/10; H04L 47/12; H04L 47/125; H04L 47/34; H04L 45/04
See application file for complete search history.

(56) References Cited

U.S. PATENT DOCUMENTS

| 2010/0157768 | A1 | 6/2010 | Mueller | |
|---|---|---|---|---|
| 2014/0362705 | A1* | 12/2014 | Pan | ......................... H04L 45/00 370/237 |
| 2016/0094454 | A1 | 3/2016 | Jain et al. | |
| 2016/0149816 | A1* | 5/2016 | Wu | ....................... H04L 47/125 370/235 |

(Continued)

FOREIGN PATENT DOCUMENTS

| CN | 102164081 A | 8/2011 |
|---|---|---|
| CN | 102282810 A | 12/2011 |

(Continued)

*Primary Examiner* — Pao Sinkantarakorn
*Assistant Examiner* — Kabir U Jahangir
(74) *Attorney, Agent, or Firm* — Womble Bond Dickinson (US) LLP

(57) ABSTRACT

Embodiments of the invention provide a data communication method, including: sending, by a first aggregation node in a first pod, data packets of a first data flow to at least one core node in a core layer in a packet based balancing manner; receiving, by the at least one core node, the data packets of the first data flow, and sending the received data packets to a second aggregation node in a second pod; and receiving, by the second aggregation node, the data packets of the first data flow, and sorting the data packets of the first data flow to obtain the first data flow.

8 Claims, 8 Drawing Sheets

(56) References Cited

U.S. PATENT DOCUMENTS

| | | | | |
|---|---|---|---|---|
| 2016/0191400 A1* | 6/2016 | Sreeramoju | ............. | H04L 47/34 |
| | | | | 370/474 |
| 2019/0158391 A1* | 5/2019 | Lo | ........................... | H04L 45/48 |
| 2020/0236043 A1* | 7/2020 | Sze | .................... | H04L 43/0882 |

FOREIGN PATENT DOCUMENTS

| | | | | |
|---|---|---|---|---|
| CN | 102355413 | A | | 2/2012 |
| CN | 102420775 | A | | 4/2012 |
| CN | 102546397 | A | | 7/2012 |
| CN | 102710489 | A | | 10/2012 |
| CN | 102917084 | A | | 2/2013 |
| CN | 105610709 | A | * | 5/2016 |
| CN | 105610709 | A | | 5/2016 |
| CN | 106059821 | A | | 10/2016 |
| WO | 2017012471 | A1 | | 1/2017 |

* cited by examiner

| MAC header | IP header | TCP/UDP header | First sequence indicator | Second sequence indicator | Load portion |

FIG. 7

DATA COMMUNICATION METHOD AND DATA COMMUNICATIONS NETWORK

CROSS-REFERENCE TO RELATED APPLICATIONS

This application is a continuation of International Application No. PCT/CN2018/097230, filed on Jul. 26, 2018, which claims priority to Chinese Patent Application No. 201710648283.4, filed on Aug. 1, 2017, the disclosures of which are incorporated herein by reference in their entireties.

TECHNICAL FIELD

Embodiments of this application relate to the field of communications technologies, and in particular, to a data communication method and a data communications network.

BACKGROUND

A data center network (DCN) typically adopts a hierarchical networking mode to provide a fully connected network for large quantities of servers in a data center, and exchange data between different servers. A network with hierarchical networking typically includes three layers: an access layer, an aggregation layer, and a core layer. A downlink port of the access layer is connected to a server, an uplink port of the access layer is connected to a downlink port of the aggregation layer, and an uplink port of the aggregation layer is connected to the core layer. The access layer and the aggregation layer can be divided into a plurality of pods. With the aggregation layer, data traffic can be exchanged between different connected servers that are in one pod. With the aggregation layer and the core layer, data traffic can be exchanged between connected servers that are in different pods. Each layer may include a plurality of nodes, and one pod may also include a plurality of nodes. Therefore, in exchanging data traffic, there is a plurality of transmission paths available from any source node to a destination node.

In the prior art, data traffic is generally exchanged based on load balancing (LB). Load balancing includes flow based balancing and packet based balancing. Flow based balancing means that, when a plurality of data flows are transmitted at a same moment or at different moments, one transmission path is allocated for each data flow, and all data contents of the corresponding data flow are sent through the allocated transmission path. When data packets are sent with flow based balancing, because all contents of a data flow are transmitted through one transmission path, a correct ordering is kept. Packet based balancing means that a plurality of data packets of one data flow are distributed into a plurality of transmission paths according to a given load distribution principle, and finally a destination access node sorts the data packets received from the plurality transmission paths to obtain a correct ordering of the packets.

However, flow based balancing is apt to Hash collisions. To be specific, as a plurality of data flows are distributed on one uplink port, if these data flows have burst traffic at the same time, the uplink port is congested. In packet based balancing, packets belonging to one data flow are sent through different paths that have different congestion degrees and correspondingly different latencies. Therefore, these data packets arrive at a destination node at different times, and the destination node needs to sort these data packets. In a network, there are many aggregation nodes in one pod and also many core nodes connected to them. Hence, there is a large quantity of available transmission paths, each having a different latency. Consequently, memory space required for the destination access node to perform sorting is relatively large, and a sorting workload is heavy, resulting in low data communications efficiency.

SUMMARY

Embodiments of the present invention provide a data communication method and a data communications network, so as to improve efficiency of data communications.

In order to achieve the foregoing objective, the following technical solutions are used in the embodiments of the present invention.

According to a first aspect, a data communication method is provided, which is applied to a data communications network that includes a plurality of pods and a core layer, where each of the plurality of pods includes an aggregation layer, the aggregation layer includes a plurality of aggregation nodes, and the core layer includes a plurality of core nodes; and the method includes: sending, by a first aggregation node in a first pod, data packets of a first data flow to at least one core node in the core layer in a packet based balancing manner; receiving, by the at least one core node, the data packets of the first data flow and sending the received data packets to a second aggregation node in a second pod; and receiving, by the second aggregation node, the data packets of the first data flow, and sorting the data packets of the first data flow to obtain the first data flow. In the foregoing technical solution, by sending the data packets of the first data flow in a packet based balancing manner, the first aggregation node can send the first data flow by utilizing bandwidth of an uplink port of the first aggregation node and available transmission paths efficiently, avoiding port congestion. In addition, a second aggregation unit sorts the received data packets and restores the first data flow, thereby reducing memory space required and sorting complexity for a destination access node to sort the data packets received from different transmission paths and further improving efficiency of data communications.

In one embodiment, each of the plurality of pods further includes an access layer, and the access layer includes a plurality of access nodes; and before the sending, by a first aggregation node in a first pod, data packets of a first data flow to at least one core node in the core layer in a packet based balancing manner, the method further includes: sending, by a first access node in the first pod, the data packets contained in the first data flow to the first aggregation node in a flow based balancing manner. In the foregoing embodiment, the first access node sends the first data flow to the first aggregation node in a flow based balancing manner, so that when the second aggregation node sends the first data flow to a second access node, the second access node does not need to sort the first data flow. Therefore, different port bandwidths and available transmission paths can be efficiently utilized to improve efficiency of data communications.

In one embodiment, each of the plurality of pods further includes an access layer, where the access layer includes a plurality of access nodes; and before the sending, by a first aggregation node in a first pod, data packets of a first data flow to at least one core node in the core layer in a packet based balancing manner, the method further includes: sending, by a first access node in the first pod, data packets contained in a second data flow to at least two aggregation nodes in the first pod in a packet based balancing manner, where the at least two aggregation nodes include the first aggregation node and the second data flow includes at least two first data flows; and correspondingly, after the receiving, by the second aggregation node, the data packets of the first data flow, and sorting the data packets of the first data flow to obtain the first data flow, the method further includes: receiving, by a second access node in the second pod, the at least two first data flows sent by at least two aggregation nodes in the second pod, and sorting the at least two first data flows to obtain the second data flow, where the at least two aggregation nodes in the second pod include the second aggregation node. In the foregoing embodiment, the first access node sends the first data flow to the plurality of aggregation nodes in the first pod in a packet based balancing manner, and each aggregation node also sends the received data packets in a packet based balancing manner. After receiving the data packets, the aggregation nodes in the second pod sort them to restore an ordering of the disordered data packets caused by the distributing of the aggregation nodes in the first pod. Then, after receiving all the data packets, the second access node sorts the disordered data packets caused by the distributing of the first access nodes, to obtain a correct ordering of the data packets of the data flow, and therefore sorts the disordered data packets in two layers, thereby reducing memory space required and sorting complexity for the second access node to sort the data packets from different transmission paths and further improving efficiency of data communications.

In one embodiment, each data packet includes a first sequence indicator and a second sequence indicator, where the first sequence indicator is used to indicate an ordering position of the data packet of the first data flow, and the second sequence indicator is used to indicate an ordering position of the data packet of the second data flow. In the foregoing embodiment, when each data packet includes the first sequence indicator and the second sequence indicator, the second aggregation node and the second access node can sort the data packets based on corresponding sequence indicators in the data packets, thereby improving efficiency of sorting and further increasing efficiency of data communications.

According to a second aspect, a data communication method is provided, which is applied to a data communications network that includes a plurality of pods, where the plurality of pods are communicatively connected through a core node, each pod includes an aggregation layer and an access layer, the aggregation layer includes a plurality of aggregation nodes, and the access layer includes a plurality of access nodes; and the method includes: determining, by a first access node, whether a second access node is in a same pod as the first access node, when the first access node receives from a server a data flow whose destination node is the second access node; and if the second access node is not in the same pod as the first access node, sending, by the first access node, the data flow to an aggregation node in one pod in a flow based balancing manner; or if the second access node is in the same pod as the first access node, sending, by the first access node, the data flow to aggregation nodes in one pod in a packet based balancing manner. In the foregoing technical solution, the first access node can determine, based on whether the destination node of the data flow is in the same pod as the first access node, whether the data flow is sent in a flow based balancing manner or in a packet based balancing manner, so that different port bandwidths and available transmission paths can be efficiently utilized to improve efficiency of data communications.

In one embodiment, when the first access node sends the data flow to the first aggregation node in one pod in a flow based balancing manner, the method further includes: when the first aggregation node receives the data flow, sending, by the first aggregation node, data packets contained in the data flow to at least one core node in the core layer in a packet based balancing manner; sending, by the at least one core node, the received data packets to a second aggregation node in a same pod as the second access node; sorting the data packets to obtain the data flow when the second aggregation node receives the data packets sent by the at least one core node; and sending, by the second aggregation node, the data flow to the second access node according to an ordering of the data packets of the data flow.

According to a third aspect, a data communications network is provided, where the data communications network includes a plurality of pods and a core layer, each of the plurality of pods includes an aggregation layer, the aggregation layer includes a plurality of aggregation nodes, and the core layer includes a plurality of core nodes, where a first aggregation node in a first pod is configured to send data packets of a first data flow to at least one core node in the core layer in a packet based balancing manner; the at least one core node is configured to receive the data packets of the first data flow and send the data packets of the first data flow to a second aggregation node in a second pod; and the second aggregation node is configured to receive the data packets of the first data flow, and sort the data packets of the first data flow to obtain the first data flow.

In one embodiment, each of the plurality of pods further includes an access layer, and the access layer includes a plurality of access nodes, where a first access node in the first pod is configured to send the data packets contained in the first data flow to the first aggregation node in a flow based balancing manner.

In one embodiment, each of the plurality of pods further includes an access layer, and the access layer includes a plurality of access nodes, where a first access node in the first pod is configured to send data packets contained in a second data flow to at least two aggregation nodes in the first pod in a packet based balancing manner, where the at least two aggregation nodes include the first aggregation node and the second data flow includes at least two first data flows; and a second access node in the second pod is configured to receive the at least two first data flows sent by at least two aggregation nodes in the second pod, and sort the at least two first data flows to obtain the second data flow, where the at least two aggregation nodes in the second pod include the second aggregation node.

In one embodiment, each data packet includes a first sequence indicator and a second sequence indicator, where the first sequence indicator is used to indicate an ordering position of the data packet of the first data flow, and the second sequence indicator is used to indicate an ordering position of the data packet of the second data flow.

According to a fourth aspect, a data communications network is provided, where the data communications network includes a plurality of pods, where the plurality of pods are communicatively connected through a core node, each pod includes an aggregation layer and an access layer, the aggregation layer includes a plurality of aggregation nodes, and the access layer includes a plurality of access nodes, where a first access node is configured to determine whether a second access node is in a same pod as the first access node, when the first access node receives from a server a data flow whose destination node is the second access node; and the first access node is further configured to send, if the second access node is not in the same pod as the first access node, the data flow to an aggregation node in one pod in a flow based balancing manner; or the first access node is further configured to send, if the second access node is in the same pod as the first access node, the data flow to aggregation nodes in one pod in a packet based balancing manner.

In one embodiment, the first aggregation node is configured to send, when receiving the data flow, data packets contained in the data flow to at least one core node in the core layer in a packet based balancing manner; the at least one core node is configured to send the received data packets to a second aggregation node in a same pod as the second access node; the second aggregation node is configured to sort the data packets to obtain the data flow when receiving the data packets sent by the at least one core node; and the second aggregation node is further configured to send the data flow to the second access node according to an ordering of the data packets of the data flow.

In another aspect, a node is provided. The node is configured to implement any one of the first aspect or the possible implementations of the first aspect, or a function of any node in the data communication method provided by the second aspect, where the function may be implemented by hardware or by hardware executing corresponding software. The hardware or software includes one or more units corresponding to the foregoing function.

In one embodiment, a structure of the node includes a processor and a communications interface. The processor is configured to support the management node in performing any one of the first aspect or the possible implementations of the first aspect, or steps of any node in the method provided by the second aspect. The communications interface is configured to support communication between the node and another network element. The node may further include a memory. The memory is configured to be coupled to the processor and stores program code and data necessary for the device.

In another aspect, a computer-readable storage medium is provided, where the computer-readable storage medium stores instructions; and when the computer-readable storage medium runs on a computer, the computer is enabled to perform steps of any node in the data communication method provided by the foregoing aspects.

In another aspect, a computer program product including an instruction is provided; and when the computer program product is run on a computer, the computer is enabled to perform the steps of any node in the data communication method provided by the foregoing aspects.

It can be understood that each of the network, device, computer storage medium, and computer program product in any one of the foregoing data communication methods is used to perform the corresponding method provided above. Therefore, for beneficial effects that can be achieved by them, refer to the beneficial effects in the corresponding method provided above. Details are not described herein again.

BRIEF DESCRIPTION OF DRAWINGS

FIG. 7 is a schematic diagram of a format of a packet header according to an embodiment.

DESCRIPTION OF EMBODIMENTS

Figure 1:
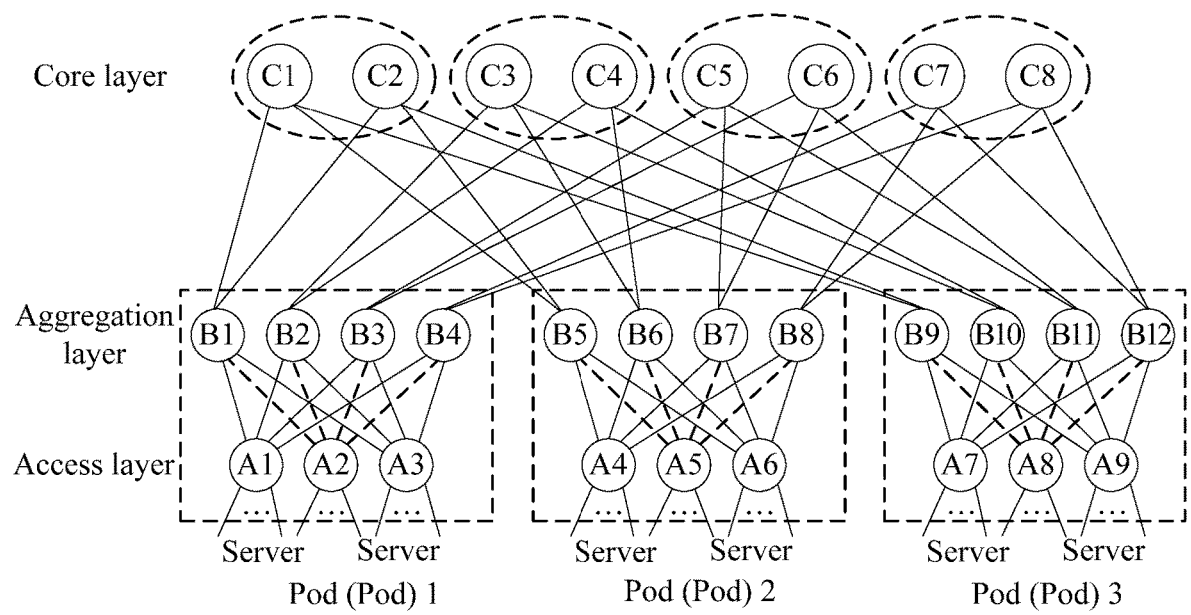
FIG. 1 is a schematic structural diagram of a data communications network.

FIG. 1 is a schematic structural diagram of a data communications network in a hierarchical networking mode. Referring to FIG. 1, the data communications network includes an access layer, an aggregation layer, and a core layer. The access layer includes a plurality of access nodes, the aggregation layer includes a plurality of aggregation nodes, and the core layer includes a plurality of core nodes. A downlink port of the access node is connected to a server that needs to exchange data traffic, an uplink port of the access node is connected to a downlink port of the aggregation node, and an uplink port of the aggregation node is connected to the core node. The aggregation layer and the access layer may be divided into a plurality of pods. One pod may include a plurality of access nodes and a plurality of aggregation nodes, and each access node is connected to the plurality of aggregation nodes. A plurality of core nodes connected to a same aggregation node may be referred to as a core plane, and each core plane is connected to different aggregation nodes in the pods. In FIG. 1, the network that includes three pods, where one pod includes three access nodes and four aggregation nodes and each core plane includes two core nodes is used as an example for description. In FIG. 1, the access nodes may be represented as A1 to A9, the aggregation nodes may be represented as B1 to B12, the core nodes may be represented as C1 to C8, and three pods are represented as a pod 1 to a pod 3.

Data traffic can be exchanged between servers connected to different access nodes in one pod by an aggregation node that is in a same pod as the access node. For example, when a server connected to the access node A1 and a server connected to the access node A3 need to exchange data traffic, the access node A1 may send, to the access node A3 by using the aggregation node B1, a data flow from the server connected to the access node A1. Data traffic can be exchanged between servers connected to access nodes in different pods by an aggregation node that is in a same pod as the access node and a core node connected to the aggregation node. For example, when a server connected to the access node A1 and a server connected to the access node A5 need to exchange data traffic, the access node A1 may send to the aggregation node B1 a data flow from the server connected to the access node A1, the aggregation node B1 forwards the data flow to the core node C1, and then, the data flow is sent by C1 to the access node A5 by using the aggregation node B5.

In the prior art, when data traffic is exchanged in a flow based balancing manner, a plurality of equal cost multiple paths (ECMPs) are usually obtained by using a Hash algorithm. Flow based balancing means that, when a plurality of data flows are transmitted at a same moment or at different moments, one transmission path is allocated for each data flow, and all data contents of the corresponding data flow are sent through the allocated transmission path. When data packets are sent with flow based balancing, because all contents of a data flow are transmitted through one transmission path to exchange data traffic between different servers, a correct ordering is kept. For example, in the network shown in FIG. 1, if a source access node is A1 and a destination access node is A5, because one pod includes four aggregation nodes and one aggregation node is connected to two core nodes, there are a total of eight paths from A1 to A5. A final transmission path selected based on the Hash algorithm is A1-B1-C1-B5-A5. Although an ordering of data packets of a data flow is kept when the data packets of the data flow are sent in a flow based balancing manner, the Hash algorithm-based routing mechanism generates Hash collisions. To be specific, according to the Hash algorithm, a plurality of data flows are sent on one port. For example, the access node A1 sends a plurality of data flows through the path A1-B1-C1-B5-A5 at the same time, causing port congestion on this path. In addition, there are many available transmission paths, and only one of the paths is used for transmission in a flow based balancing manner, also causing a waste of resources.

In the prior art, when data traffic is exchanged in a packet based balancing manner, data packets of one data flow are usually distributed into a plurality of transmission paths according to a given load distribution principle, and therefore the data packets of the data flow are out of order; when receiving the data packets passing through different transmission paths, a destination access node needs to sort the received data packets to restore a correct ordering of the data packets of the data flow. For example, in the network shown in FIG. 1, if a source access node is A1 and a destination access node is A5, there are a total of eight paths from A1 to A5. The source access node may evenly distribute a data flow to the aggregation nodes B1 to B4 in one pod, B1 evenly distributes received data packets to the core nodes C1 and C2 connected to B1, and C1 and C2 send the data packets to B5; similarly, B2, B3 and B4 correspondingly forward data packets to B6, B7, and B8; then, B5, B6, B7, and B8 send the received data packets to the destination access node A5, and A5 sorts the data packets received from different transmission paths to obtain an initial ordering of the data packets. When data traffic is exchanged in a packet based balancing manner, more aggregation nodes in one pod and more core nodes connected to them bring more available transmission paths, while each may have a different latency. Therefore, the destination access node needs to keep first received data packets and sort all the data packets after their arrival. Consequently, memory space required is relatively large, and a workload after sorting is also heavy.

Port bandwidths of different nodes in the network may be different. For example, a bandwidth of the uplink port (such as 10 Gbps) of the access node is usually greater than a bandwidth of the downlink port (such as 40 Gbps) of the access node. A solution provided by the embodiments of this application efficiently utilizes port bandwidths of different nodes and available transmission paths in the network to exchange data traffic between different nodes. Therefore, while the port congestion is avoided, the memory space required for the destination access node to perform sorting and a sorting workload are reduced, and efficiency of data exchange is improved.

The embodiments of this application are applied to a scenario of data traffic exchange. The embodiments of this application do not specifically limit a quantity of pods included in an exchange network, a quantity of aggregation nodes and access nodes in each pod, a quantity of core planes included in the network, and a quantity of core nodes in each core plane. In addition, quantities of core nodes included in different core planes in the network may be the same or different, and quantities of aggregation nodes and access nodes in different pods may be the same or different.

Figure 2:
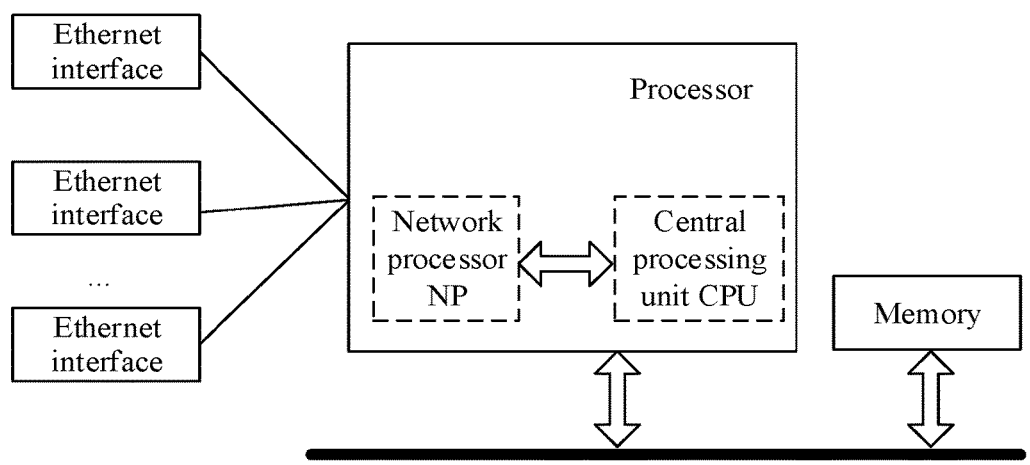
FIG. 2 is a schematic structural diagram of a node in a network according to an embodiment.

FIG. 2 is a schematic structural diagram of a node according to an embodiment. The node may be a core node, an aggregation node, or an access node. In some embodiments, a core node, an aggregation node, and an access node in a network may be a switch, a router, or another network device. In this embodiment, a switch is used as an example to describe a structure of the node.

Referring to FIG. 2, the node includes a processor, a memory, and an Ethernet interface. The processor performs various functions of the node by running or executing a software program and/or a module stored in the memory and by invoking data stored in the memory. The processor may include one or more modules, such as a central processing unit (CPU) and a network processor (NP). The network processor may be implemented by an application-specific integrated circuit (ASIC) or a field-programmable gate array (FPGA) chip. The memory may be configured to store the data, the software program, and the module, and may be implemented by any type of volatile or non-volatile memory or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. The Ethernet interface is a port of the node. A node may include a plurality of Ethernet interfaces. Each Ethernet interface may be configured as an uplink port of the node or a downlink port of the node, and the node may forward data traffic through the uplink port and the downlink port.

It can be understood by a person skilled in the art that the structure of the node shown in FIG. 2 does not constitute a limitation on a structure of the node. In practical application, the node may include more or fewer components than those shown in the figure, or a combination of some components, or components disposed differently.

Figure 3:
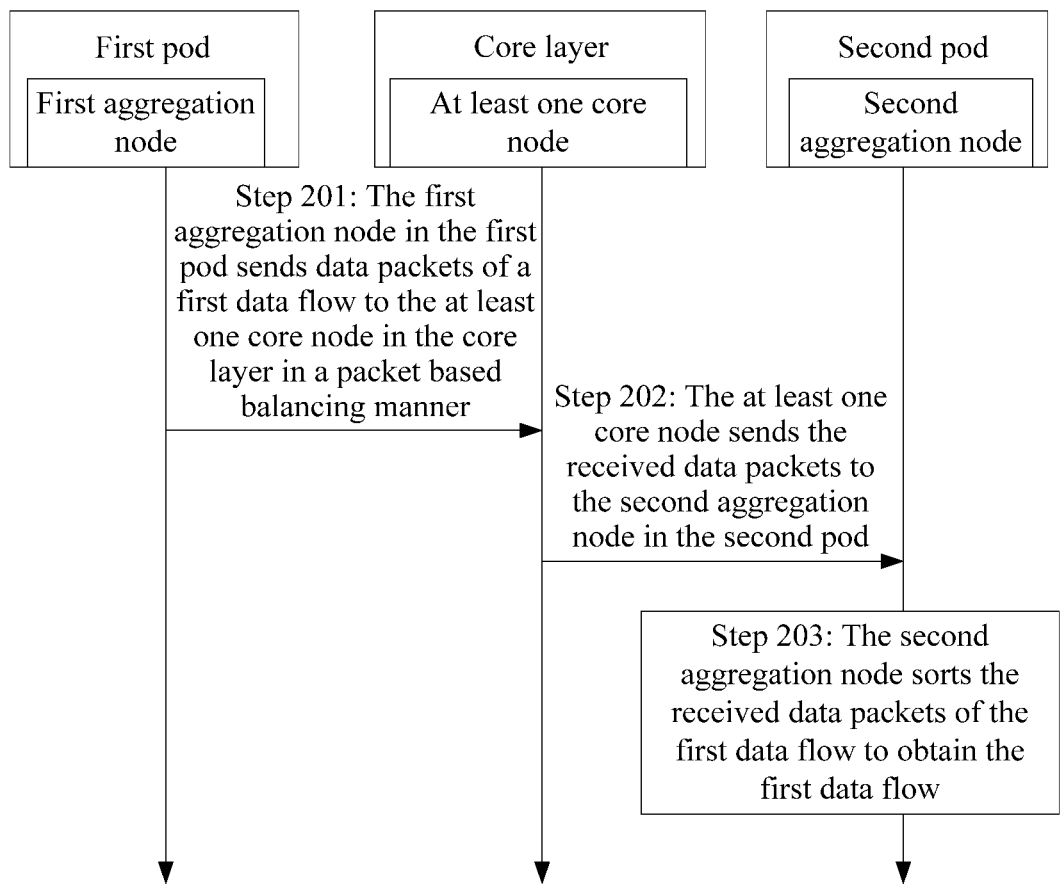
FIG. 3 is a schematic flowchart of a data communication method according to an embodiment.

FIG. 3 is a schematic flowchart of a data communication method according to an embodiment. The method is applied to a data communications network that includes a plurality of pods and a core layer. Referring to FIG. 3, the method includes the following several steps.

Step 201: A first aggregation node in a first pod sends data packets of a first data flow to at least one core node in the core layer in a packet based balancing manner.

The first pod may be any one of the plurality of pods, and the first data flow may be a data flow in data traffic that needs to be exchanged by a server connected to the first pod. An aggregation layer included in the first pod includes a plurality of aggregation nodes, and the first aggregation node may be any one of the plurality of aggregation nodes. The at least one core node may be a core node connected to the first aggregation node in the core layer.

In addition, the first data flow may contain a plurality of data packets, and when a plurality of data packets are distributed in a packet based balancing manner, data packets distributed into each available transmission path may be mutually consecutive data packets of the first data flow, or data packets that are spaced apart from each other in the first data flow, or data packets that are distributed according to another rule. For example, the first data flow contains a data packet 1 to a data packet 4, and there are two available transmission paths. Then, the data packet 1 and the data packet 2 may be sent to a first transmission path, and the data packet 3 and the data packet 4 may be sent to a second transmission path; or the data packet 1 and the data packet 3 may be sent to a first transmission path, and the data packet 2 and the data packet 4 may be sent to a second transmission path; or the like. This embodiment does not impose any limitation on this.

In one embodiment, the first aggregation node may distribute, according to a given load distribution principle, the data packets contained in the first data flow to at least one core node connected to the aggregation node. When the at least one core node is one core node, the core node may include a plurality of downlink ports, and therefore the first aggregation node distributes the data packets contained in the first data flow to the plurality of downlink ports of the core node. Using the network shown in FIG. 1 as an example, if the first pod is the pod 1, the first data flow is a data flow of the aggregation node B1 in the pod 1, and the first data flow contains a data packet 1 to a data packet 4; when the first aggregation node is B1, the at least one core node connected to B1 is C1 and C2; when the aggregation node B1 distributes the data packets according to a rule that data packets in one transmission path are spaced apart from each other, the aggregation node B1 may send the data packet 1 and the data packet 3 to the core node C1 and send the data packet 2 and the data packet 4 to the core node C2.

It should be noted that, when the data packets of the first data flow are distributed in a packet based balancing manner, quantities of data packets received by each core node after the distribution may be the same or different. In addition, a difference between quantities of data packets received by any two core nodes is a maximum of 1.

Step 202: The at least one core node receives the data packets of the first data flow, and sends the received data packets to a second aggregation node in a second pod.

The second pod is any pod that is different from the first pod among the plurality of pods, and a server connected to the second pod is a server with which the server connected to the first pod needs to exchange data traffic. To be specific, the server connected to the first pod is a source server, the server connected to the second pod is a destination server, and the source server needs to send the data traffic to the destination server. The second aggregation node may be an aggregation node connected to the at least one core node in the second pod.

In one embodiment, the data packets of the first data flow may include information used to identify a path between a core node and the second aggregation node, such as address information or routing information of the second aggregation node. Therefore, when the at least one core node receives the data packets of the first data flow, the at least one core node may send the received data packets to the second aggregation node connected to the at least one core node in the second pod based on the address information, the routing information, or the like. Using the network shown in FIG. 1 as an example, when the aggregation node B1 sends a data packet 1 and a data packet 3 to the core node C1, and sends a data packet 2 and a data packet 4 to the core node C2, if the second pod is the pod 2, the core node C1 may send the data packet 1 and the data packet 3 to the aggregation node B5 when receiving them; the core node C2 may also send the data packet 2 and the data packet 4 to the aggregation node B5 when receiving them.

Step 203: The second aggregation node receives the data packets of the first data flow, and sorts the data packets of the first data flow to obtain the first data flow.

When the first aggregation node distributes the data packets of the first data flow to the at least one core node in a packet based balancing manner, the data packets of the first data flow are out of order. Therefore, when the second aggregation node receives the out-of-order data packets of the first data flow, the second aggregation node may sort them to restore a correct ordering of the data packets to obtain the first data flow.

In one embodiment, the second aggregation node may sort the data packets of the first data flow according to the rule used when the first aggregation node distributes the data packets of the first data flow, to obtain the first data flow. The rule of distributing the data packets of the first data flow in a packet based balancing manner may be preset or pre-configured at the first aggregation node and the second aggregation node.

Using the network shown in FIG. 1 as an example, when the second aggregation node B5 receives the data packet 1 and the data packet 3 that are sent by the core node C1, and receives the data packet 2 and the data packet 4 that are sent by the core node C2, the second aggregation node B5 may sort the data packets according to the rule used when the first aggregation node B1 distributes the data packets (for example, the rule is that the data packets are spaced apart from each other for distribution), to obtain the data packet 1 to the data packets 4 and further obtain the first data flow.

In one embodiment, each data packet contained in the first data flow may include a first sequence indicator, and the first sequence indicator is used to indicate an ordering position of the data packet of the first data flow. Therefore, when the second aggregation node sorts the data packets of the first data flow, the second aggregation node may determine ordering positions of the data packets of the first data flow based on the first sequence indicator in each data packet, thereby sorting the data packets of the first data flow to obtain the first data flow.

Further, each of the plurality of pods further includes an access layer. The access layer includes a plurality of access nodes; the first data flow sent by the first aggregation node in the first pod may be sent by a first access node in the first pod; the first access node is an access node connected to the source server, and the first access node may send the first data flow in a flow based balancing manner or in a packet based balancing manner. Details are described below.

Figure 4:
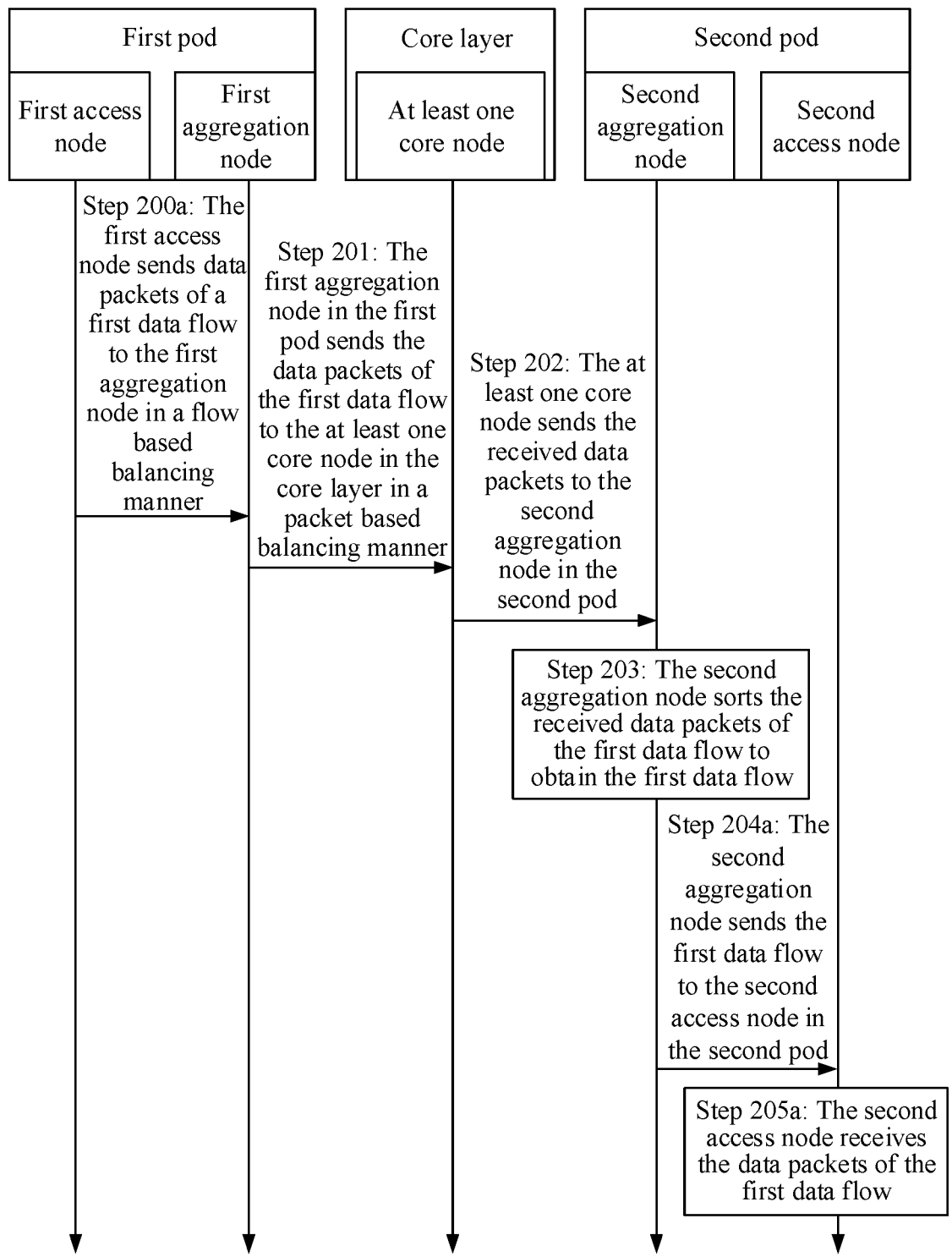
FIG. 4 is a schematic flowchart of another data communication method according to an embodiment.

(1) The first access node sends the first data flow in a flow based balancing manner. Referring to FIG. 4, before the step 201, the method further includes step 200*a*.

Step 200*a*: The first access node sends the data packets of the first data flow to the first aggregation node in a flow based balancing manner.

When receiving the first data flow from the source server, the first access node may send the data packets of the first data flow to the first aggregation node in the first pod in a flow based balancing manner. The first aggregation node may be any one of the plurality of aggregation nodes included in the aggregation layer in the first pod or may be an aggregation node selected from the plurality of aggregation nodes based on a Hash algorithm.

Correspondingly, as shown in FIG. 4, after the step 203, the method further includes: step 204*a* and step 205*a*.

Step 204*a*: The second aggregation node sends the first data flow to a second access node in the second pod.

If the destination server is connected to the second access node in the second pod, the second access node is a destination access node of the first data flow; after the second aggregation node obtains the first data flow by sorting, the second aggregation node may send the first data flow to the second access node.

Step 205*a*: The second access node receives the data packets of the first data flow.

When the first access node sends the data packets of the first data flow in a flow based balancing manner, the ordering of the data packets of the first data flow is not affected. Therefore, when the second access node receives the data packets of the first data flow, the second access node directly sends them to the destination server, thereby implementing data traffic exchange between the source server and the destination server.

Figure 5:
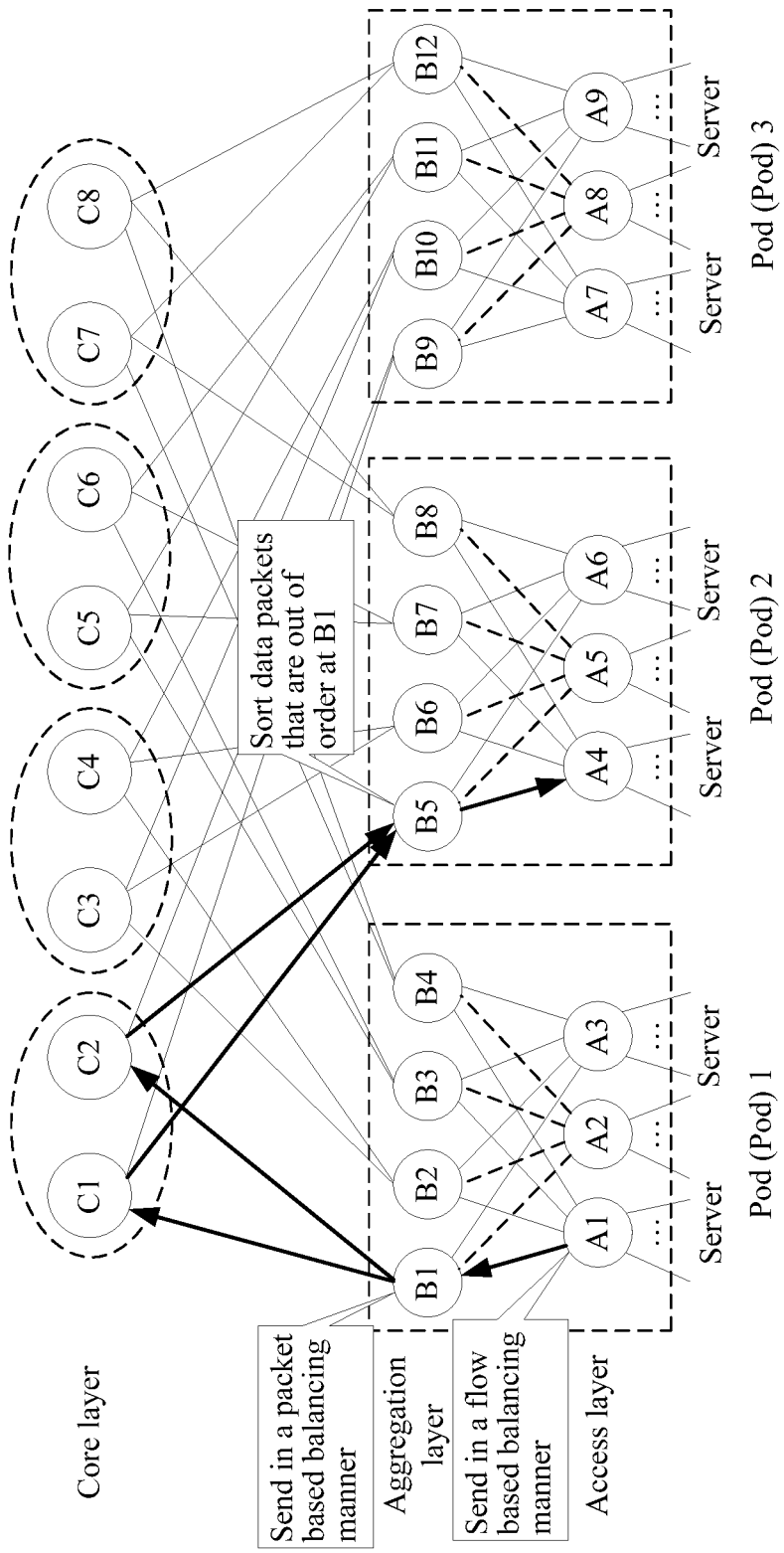
FIG. 5 is a schematic diagram of data communications according to an embodiment.

Using the network shown in FIG. 1 as an example, a process of sending the first data flow from the first access node connected to the source server to the second access node connected to the destination server may be shown in FIG. 5. In one embodiment, the first access node A1 sends the data packets of the first data flow to the first aggregation node B1 in a flow based balancing manner; the first aggregation node B1 sends the data packets of the first data flow to the core node C1 and the core node C2 in a packet based balancing manner, and the core nodes C1 and C2 send them to the second aggregation node B5; the second aggregation node B5 sorts the data packets that are out of order during distribution of the first aggregation node in the pod 1, and sends the sorted first data flow to the second access node A5.

Further, when the first access node sends the first data flow to the second access node by using the data communications network, the first access node may distribute, in a packet based balancing manner, the data packets of the first data flow to the plurality of aggregation nodes in the first pod that the first access node lies in. The plurality of aggregation nodes send the data packets received by them to the core node connected to the plurality of aggregation nodes in a flow based balancing manner, and the core node forwards the data packets to a plurality of aggregation nodes in the second pod; the plurality of aggregation nodes in the second pod forward them to the second access node in the second pod. Then, the second access node sorts the received data, and restores the received data packets to the ordering before the data packets are distributed by the first access node in a packet based balancing manner, thereby obtaining the first data flow.

Figure 6:
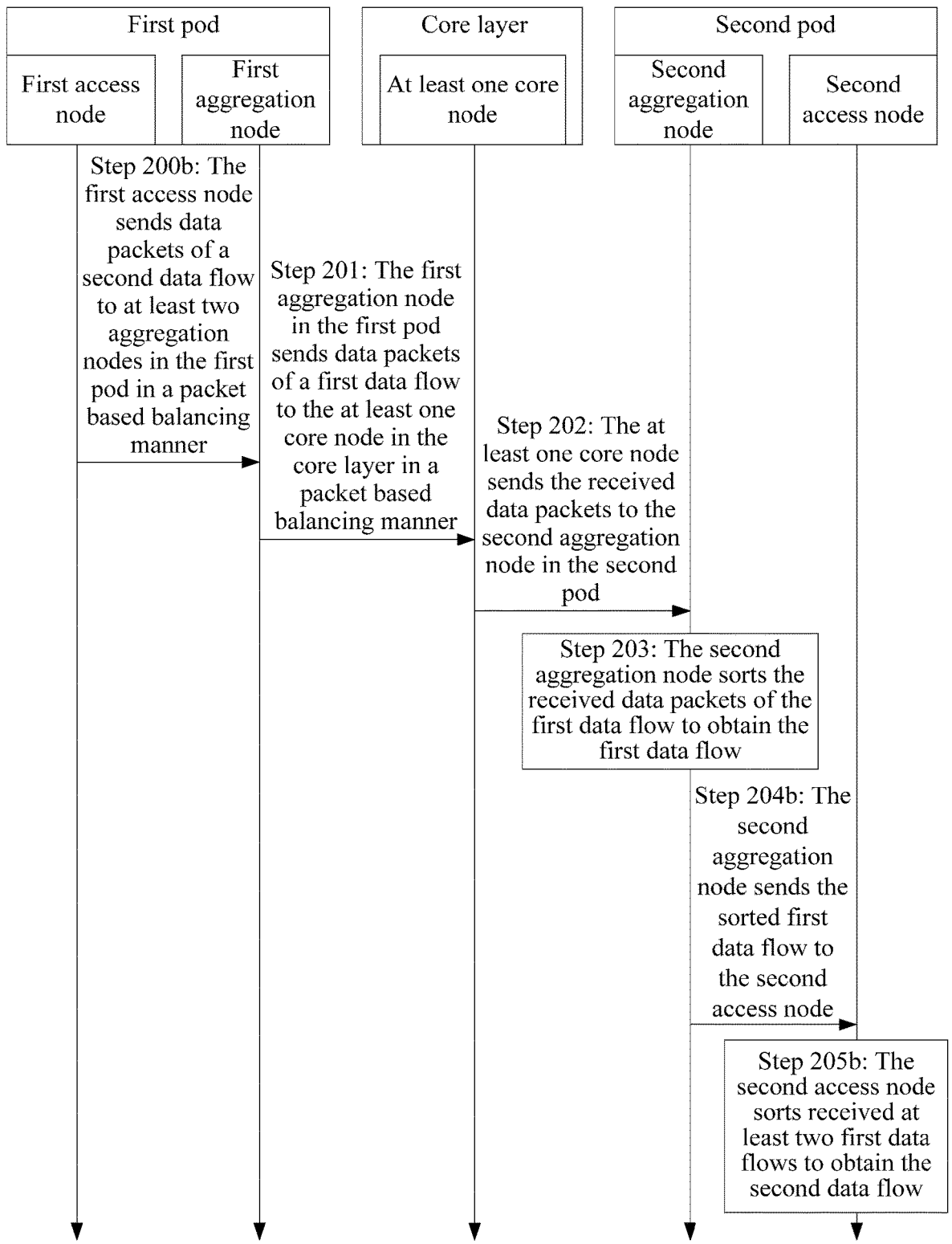
FIG. 6 is a schematic flowchart of still another data communication method according to an embodiment.

(2) The first access node sends the data packets in a packet based balancing manner. Referring to FIG. 6, before the step 201, the method further includes step 200*b*.

Step 200*b*: The first access node sends data packets of a second data flow to at least two aggregation nodes in the first pod in a packet based balancing manner, where the at least two aggregation nodes include the first aggregation node and the second data flow includes at least two first data flows.

When the first access node receives the second data flow from the source server, the first access node may send the data packets of the second data flow to the at least two aggregation nodes in the first pod in a flow based balancing manner. To be specific, the second data flow includes at least two first data flows, and the first access node sends one first data flow to each of the at least two aggregation nodes.

The first data flow is a data flow corresponding to each aggregation node after the first access node distributes the data packets of the second data flow to the plurality of aggregation nodes in the first pod in a packet based balancing manner. Using the network shown in FIG. 1 as an example, if the second data flow includes a data packet 1 to a data packet 8, the first access node A1 distributes the data packet 1 to a data packet 10 to the aggregation nodes B1 to B4, and first data flows corresponding to the aggregation nodes B1 to B4 contain: the data packet 1 and the data packet 5, the data packet 2 and the data packet 6, the data packet 3 and the data packet 7, and the data packet 4 and the data packet 8, respectively.

It should be noted that, when the data packets of the second data flow are distributed in a packet based balancing manner, quantities of data packets contained in the first data flows after the distribution may be the same or different. In addition, a difference between quantities of data packets contained in any two first data flows is a maximum of 1.

After the first access node sends the first data flow to each of the at least two aggregation nodes in the first pod, each aggregation node sends data packets of the first data flow to at least two aggregation nodes in the second pod according to the foregoing step 201 to step 203, and each aggregation node sorts them to obtain the corresponding first data flow.

Correspondingly, as shown in FIG. 6, after the step 203, the method further includes: step 204*b* and step 205*b*.

Step 204*b*: The second aggregation node sends the sorted first data flow to a second access node.

The second aggregation node is any one of the at least two aggregation nodes in the second pod, and the at least two aggregation nodes respectively send the first data flows obtained after sorting by the at least two aggregation nodes to the second access node. To be specific, each of the at least two aggregation nodes may send the first data flow obtained after sorting by the aggregation node to the second access node by performing the step 204*b*.

Using the network shown in FIG. 1 as an example, the first data flows corresponding to the aggregation nodes B1 to B4 are forwarded, by the core node in the core layer, to the aggregation nodes B5 to B8 in the second pod, and the first data flows obtained after sorting by the aggregation nodes B5 to B8 contain: the data packet 1 and the data packet 5, the data packet 2 and the data packet 6, the data packet 3 and the data packet 7, and the data packet 4 and the data packet 8, respectively. Using the aggregation node B5 as an example, the aggregation node B5 sends the first data flow that contains the data packet 1 and the data packet 5 to the second access node. Similarly, the aggregation nodes B6, B7, and B8 also send the first data flows corresponding to the aggregation nodes B6, B7, and B8 to the second access node.

Step 205*b*: The second access node receives the at least two first data flows, and sorts the at least two first data flows to obtain the second data flow.

When the at least two aggregation nodes in the second pod send the first data flows obtained after sorting by the at least two aggregation nodes to the second access node, because when the first access node distributes the data packets of the second data flow to the at least two aggregation nodes in a packet based balancing manner, the data packets of the second data flow are out of order and are divided into at least two first data flows, the second access node may sort the at least two first data flows to restore an ordering of each data packet in the second data flow to obtain the second data flow.

In one embodiment, when the second access node sorts the data packets contained in the at least two first data flows, the second access node may sort the data packets according to the rule used when the first access node distributes the data packets of the second data flow, to obtain the second data flow. The rule of distributing the data packets of the second data flow in a packet based balancing manner may be preset or pre-configured at the first access node and the second access node.

Using the network shown in FIG. 1 as an example, if at least two first data flows received by the second access node A5 contain: the data packet 1 and the data 5, the data packet 2 and the data packet 6, the data packet 3 and the data packet 7, and the data packet 4 and the data packet 8, the second access node A5 may sort the data packets according to the rule used when the first access node A1 distributes the data packets (for example, the rule is that the data packets are spaced apart from each other for distribution), to obtain the data packet 1 to the data packet 8 and further obtain the second data flow.

In one embodiment, each data packet contained in the first data flow may further include a second sequence indicator, and the second sequence indicator is used to indicate an ordering position of the data packet of the second data flow. Therefore, when the second access node sorts the data packets contained in the at least two first data flows, the second access node may determine ordering positions of the data packets of the second data flow based on the second sequence indicator in each data packet, thereby sorting the data packets to obtain the second data flow. For example, a format of a packet header of each data packet is shown in FIG. 7. The packet header includes a MAC header, an IP header, a TCP/UDP header, a first sequence indicator, a second sequence indicator, and a load portion. The MAC header, the IP header, the TCP/UDP header, and the load portion are conventional packet headers, which are not described in this embodiment of this application.

Figure 8:
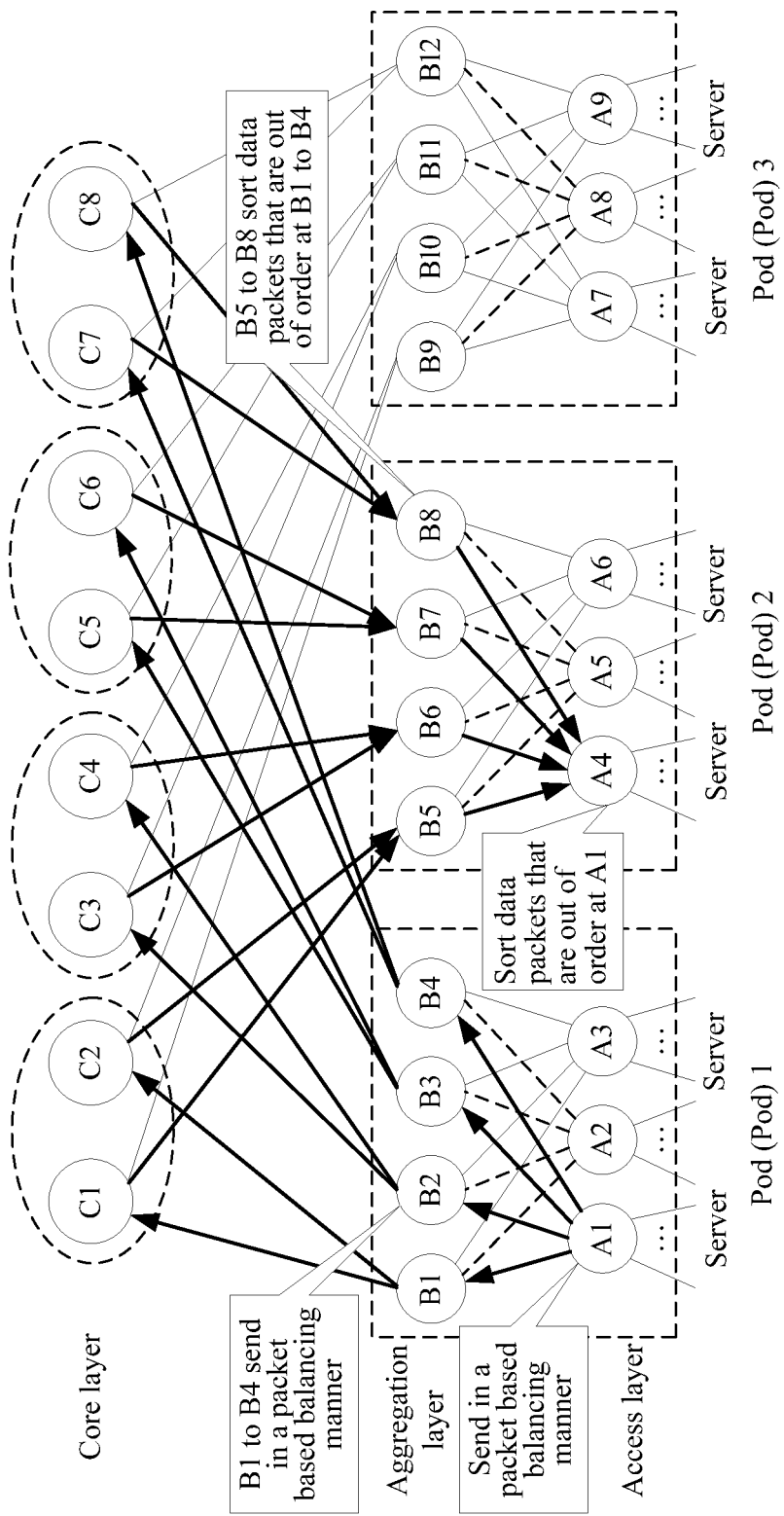
FIG. 8 is a schematic diagram of another data communications according to an embodiment.

Using the network shown in FIG. 1 as an example, a process of sending the second data flow from the first access node connected to the source server to the second access node connected to the destination server may be shown in FIG. 8. In one embodiment, the first access node A1 distributes the data packets of the second data flow to the aggregation nodes B1 to B4 in the pod 1 in a packet based balancing manner, the data packets received by each aggregation node are referred to as the first data flow, and each of the aggregation nodes B1 to B4 forwards them to the aggregation nodes B5 to B8 in the pod 2. Using the first aggregation node B1 as an example, the first aggregation node B1 sends the data packets of the first data flow to the core nodes C1 and C2 in a packet based balancing manner, and the core nodes C1 and C2 transmit them to the second aggregation node B5. The second aggregation node B5 sorts the data packets that are out of order when being distributed by the first aggregation node in the pod 1, to obtain the first data flow. Then, the aggregation nodes B5 to B8 in the pod 2 send first data flows corresponding to the aggregation nodes B5 to B8 to the second access node A4, and the second access node A4 sorts data packets contained in the received plurality of first data flows to obtain the second data flow.

Further, whether the first data flow is sent between the access layer and the aggregation layer in a flow based balancing manner or in a packet based balancing manner may be determined based on whether a destination node of the first data flow is in a same pod as the first access node. In one embodiment, the first access node determines whether the second access node is in a same pod as the first access node, when the first access node receives from the server the first data flow whose destination node is the second access node; and if the second access node is not in the same pod as the first access node, the first access node sends the first data flow to the first aggregation node in one pod in a flow based balancing manner; or if the second access node is in the same pod as the first access node, the first access node sends the first data flow to aggregation nodes in one pod in a packet based balancing manner.

To be specific, if the first data flow is exchanged in one pod, the first access node distributes data packets of the first data flow to the first aggregation nodes in one pod in a packet based balancing manner after receiving the first data flow; or if the first data flow is exchanged between different pods, the first access node sends data packets of the first data flow to an aggregation node in one pod in a flow based balancing manner after receiving the first data flow.

In this embodiment, the first access node in the first pod sends the first data flow to the first aggregation node in the first pod in a flow based balancing manner or in a packet based balancing manner; the first aggregation node distributes the data packets of the first data flow to the at least one core node in the core layer in a packet based balancing manner; the at least one core node sends the data packets to the second aggregation node in the second pod; the second aggregation node sorts them to obtain the first data flow and sends the first data flow to the second access node in the second pod; and the second access node resorts the data packets when the first access node sends them in a packet based balancing manner, to obtain the ordering of the data packets of the data flow when being sent by the first access node. Therefore, port bandwidths of different nodes and available transmission paths in the network are efficiently utilized to implement data traffic exchange between different nodes. While port congestion is avoided, memory space required for the second access node to perform sorting and a sorting workload are reduced, and efficiency of data exchange is improved.

An embodiment further provides a data communications network. The data communications network includes a plurality of pods and a core layer, each of the plurality of pods includes an aggregation layer, the aggregation layer includes a plurality of aggregation nodes, and the core layer includes a plurality of core nodes.

A first aggregation node in a first pod is configured to send data packets of a first data flow to at least one core node in the core layer in a packet based balancing manner.

The at least one core node is configured to receive the data packets of the first data flow, and send the data packets of the first data flow to a second aggregation node in a second pod.

The second aggregation node is configured to receive the data packets of the first data flow, and sort the data packets of the first data flow to obtain the first data flow.

Further, each of the plurality of pods further includes an access layer, and the access layer includes a plurality of access nodes. A first access node in the first pod is configured to send the data packets contained in the first data flow to the first aggregation node in a flow based balancing manner.

Alternatively, each of the plurality of pods further includes an access layer, and the access layer includes a plurality of access nodes. A first access node in the first pod is configured to send data packets contained in a second data flow to at least two aggregation nodes in the first pod in a packet based balancing manner, where the at least two aggregation nodes include the first aggregation node and the second data flow includes at least two first data flows; and a second access node in the second pod is configured to receive the at least two first data flows sent by the at least two aggregation nodes in the second pod, and sort the at least two first data flows to obtain the second data flow, where the at least two aggregation nodes in the second pod include the second aggregation node.

In one embodiment, each data packet includes a first sequence indicator and a second sequence indicator. The first sequence indicator is used to indicate an ordering position of the data packet of the first data flow, and the second sequence indicator is used to indicate an ordering position of the data packet of the second data flow.

An embodiment further provides a data communications network. The data communications network includes a plurality of pods, the plurality of pods are communicatively connected through a core node, each pod includes an aggregation layer and an access layer, the aggregation layer includes a plurality of aggregation nodes, and the access layer includes a plurality of access nodes. A first access node is configured to determine whether a second access node is in a same pod as the first access node, when the first access node receives from a server a data flow whose destination node is the second access node. The first access node is further configured to send, if the second access node is not in the same pod as the first access node, the data flow to an aggregation node in one pod in a flow based balancing manner. The first access node is further configured to send, if the second access node is in the same pod as the first access node, the data flow to aggregation nodes in one pod in a packet based balancing manner.

The solution provided by the embodiments is mainly described from the perspective of interaction between network elements. It can be understood that, in order to implement the foregoing functions, the network elements, such as the first aggregation node, the second aggregation node, the first access node, and the second access node, include corresponding hardware structures and/or software modules for performing various functions. A person skilled in the art should be readily aware that the network elements and algorithm steps of various examples described with reference to the embodiments disclosed herein can be implemented in a form of hardware or in a form of a combination of hardware and computer software in this application. Whether a function is implemented by hardware or by computer software driving hardware depends on specific application and design constraints of the technical solution. A person skilled in the art may use different methods to implement the described functions for each particular application, but such implementation shall not be considered to go beyond the scope of this application.

In an embodiment, the first aggregation node, the second aggregation node, the first access node, and the second access node may be divided into functional modules according to the foregoing method examples. For example, each functional module may be obtained through division in correspondence to each function, or two or more functions may be integrated into one processing module. The foregoing integrated module can be implemented in a form of hardware or a software functional module. It should be noted that the division of the modules in this embodiment of this application is an example, and is only a logical function division, and may have another division in actual implementation.

Figure 9:
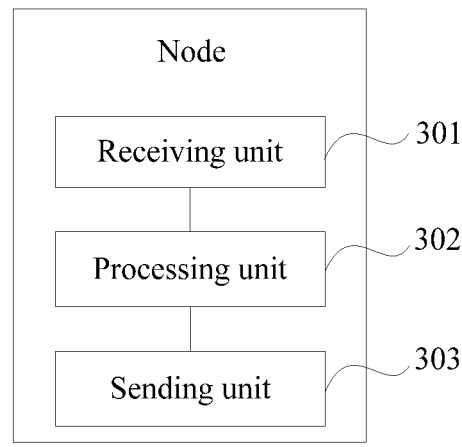
FIG. 9 is a schematic structural diagram of a node according to an embodiment.

When each functional module is obtained through division in correspondence to each function, FIG. 9 is a schematic diagram of a possible structure of the node in the foregoing embodiments. The node may be any one of the first aggregation node, the second aggregation node, the first access node, or the second access node. The node includes: a receiving unit 301, a processing unit 302, and a sending unit 303.

When the node is the first access node, the receiving unit 301 is configured to support the node in receiving a data flow sent by a source server; when the node is the first aggregation node, the receiving unit 301 is configured to support the node in receiving a data flow sent by the first access node; when the node is the second aggregation node, the receiving unit 301 is configured to support the node in receiving data packets sent by at least one core node; when the node is the second access node, the receiving unit 301 is configured to support the node in receiving data packets sent by the second aggregation node (step 205a in FIG. 4), or receive data packets sent by each aggregation node in a second pod.

When the node is the second aggregation node, the processing unit 302 is configured to support the node in performing step 203 in FIG. 3, FIG. 4, or FIG. 6; when the node is the second access node, the processing unit 302 is configured to support the node in performing step 205b in FIG. 6.

When the node is the first access node, the sending unit 303 is configured to support the node in performing step 200a in FIG. 4 or step 200b in FIG. 6; when the node is the first aggregation node, the sending unit 303 is configured to support the node in performing step 201 in FIG. 3, FIG. 4, or FIG. 6; when the node is the second aggregation node, the sending unit 303 is configured to support the node in performing step 204a in FIG. 4 or step 204b in FIG. 6.

In hardware implementation, the processing unit 302 may be a processor; the receiving unit 301 may be a receiver, the sending unit 303 may be a transmitter, and the receiver and the transmitter may constitute a communications interface.

Figure 10:
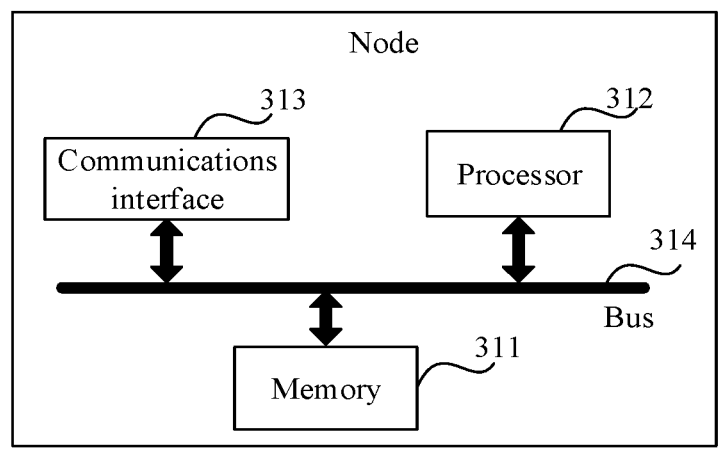
FIG. 10 is a schematic structural diagram of another node according to an embodiment.

FIG. 10 is a schematic diagram that shows a possible logical structure of the node in the foregoing embodiments provided by the embodiments of this application. The node includes: a processor 312, a communications interface 313, a memory 311, and a bus 314. The processor 312, the communications interface 313, and the memory 311 are connected to each other by the bus 314. In this embodiment of this application, the processor 312 is configured to control and manage actions of the node. For example, when the node is the second aggregation node, the processor 312 is configured to support the node in performing step 203 in FIG. 3, FIG. 4, or FIG. 6; when the node is the second access node, the processor 312 is configured to support the node in performing step 205b in FIG. 6, and/or other processes of the techniques described herein. The communications interface 313 is configured to support the node in communication. The memory 311 is configured to store program codes and data of the node.

The processor 312 may be a central processing unit, a general purpose processor, a digital signal processor, an application specific integrated circuit, a field programmable gate array or another programmable logic device, a transistor logic device, a hardware component, or any combination thereof. The processor can implement or execute various illustrative logical blocks, modules, and circuits described in combination with disclosure of this application. The processor may alternatively be a combination implementing a computing function, such as a combination including one or more microprocessors, or a combination of a digital signal processor and a microprocessor. The bus 314 may be a peripheral component interconnect (PCI) bus, an extended industry standard architecture (EISA) bus, or the like. The bus may be divided into an address bus, a data bus, a control bus, or the like. For ease of representation, only one thick line is shown in FIG. 10, but it does not mean that there is only one bus or one type of bus.

In another embodiment, a readable storage medium is further provided. The readable storage medium stores a computer-executable instruction; and a device (which may be a single-chip microcomputer, a chip, or the like) or a processor performs steps of any node in the data communication method provided in FIG. 3, FIG. 4, or FIG. 6. The readable storage medium may include any medium that can store program code, such as a USB flash drive, a removable hard disk, a read-only memory, a random access memory, a magnetic disk, or an optical disc.

In another embodiment, a computer program product is further provided. The computer program product includes a computer-executable instruction, and the computer-executable instruction is stored in a computer-readable storage medium; at least one processor of a device may read the computer-executable instruction from the computer-readable storage medium, and at least one processor may execute the computer-executable instruction to enable the device to perform steps of any node in the data communication method provided in FIG. 3, FIG. 4, or FIG. 6.

In the embodiments of this application, the first access node in the first pod sends the first data flow to the first aggregation node in the first pod in a flow based balancing manner or in a packet based balancing manner; the first aggregation node distributes the data packets of the first data flow to the at least one core node in the core layer in a packet based balancing manner; the at least one core node sends the data packets to the second aggregation node in the second pod; the second aggregation node sorts them to obtain the first data flow and sends the first data flow to the second access node in the second pod; and the second access node resorts the data packets when the first access node sends them in a packet based balancing manner, to obtain the ordering of the data packets of the data flow when being sent by the first access node. Therefore, port bandwidths of different nodes and available transmission paths in the network are efficiently utilized to implement data traffic exchange between different nodes. While port congestion is avoided, memory space required for the second access node to perform sorting and a sorting workload are reduced, and efficiency of data exchange is improved.

Finally, it should be noted that the foregoing description is only specific implementations of this application, but the protection scope of this application is not limited thereto; and any variation or replacement within the technical scope disclosed in this application shall fall within the protection scope of this application. Therefore, the protection scope of this application shall be subject to the protection scope of the claims.

What is claimed is:

1. A data communication method applied to a data communications network, the method comprising:
   sending, by a first access node in a first pod, data packets contained in a first data flow to a first aggregation node in a flow based balancing manner;
   sending, by the first aggregation node in the first pod, the data packets of the first data flow to at least one core node in a core layer in a packet based balancing manner;
   receiving, by the at least one core node, the data packets of the first data flow, and sending the received data packets to a second aggregation node in a second pod; and
   receiving, by the second aggregation node, the data packets of the first data flow, and sorting the data packets of the first data flow to obtain the first data flow, wherein the data communications network comprises a plurality of pods and the core layer, wherein each of the plurality of pods comprises an aggregation layer that comprises a plurality of aggregation nodes, and the core layer comprises a plurality of core nodes.

2. The data communication method according to claim 1, further comprising:

before sending the data packets of the first data flow to the at least one core node in the core layer in the packet based balancing manner,
   sending, by a first access node in the first pod, data packets contained in a second data flow to at least two aggregation nodes in the first pod in a packet based balancing manner, wherein the at least two aggregation nodes comprise the first aggregation node and the second data flow comprises at least two first data flows; and
   after receiving the data packets of the first data flow, and sorting the data packets of the first data flow to obtain the first data flow,
   receiving, by a second access node in the second pod, the at least two first data flows sent by at least two aggregation nodes in the second pod, and sorting the at least two first data flows to obtain the second data flow, wherein the at least two aggregation nodes in the second pod comprise the second aggregation node, wherein each of the plurality of pods further comprises an access layer that comprises a plurality of access nodes.

3. The data communication method according to claim 2, wherein each data packet of the first and second data flows comprises a first sequence indicator and a second sequence indicator, wherein the first sequence indicator is used to indicate an ordering position of the data packet of the first data flow, and the second sequence indicator is used to indicate an ordering position of the data packet of the second data flow.

4. A data communication method applied to a data communications network, the method comprising:
   determining, by a first access node, whether a second access node is in a same pod as the first access node, when the first access node receives from a server a data flow whose destination node is the second access node; and
   if the second access node is not in the same pod as the first access node, sending, by the first access node, the data flow to a first aggregation node in one pod in a flow based balancing manner; or
   if the second access node is in the same pod as the first access node, sending, by the first access node, the data flow to a plurality of aggregation nodes in one pod in a packet based balancing manner, wherein the data communications network comprises a plurality of pods communicatively connected through a core node, each pod comprising an aggregation layer and an access layer, the aggregation layer comprising the plurality of aggregation nodes, the access layer comprising a plurality of access nodes;
   when the first access node sends the data flow to the first aggregation node in one pod in the flow based balancing manner,
   when the first aggregation node receives the data flow, sending, by the first aggregation node, data packets contained in the data flow to at least one core node in a core layer in a packet based balancing manner;
   sending, by the at least one core node, the received data packets to a second aggregation node in a same pod as the second access node;
   sorting the data packets to obtain the data flow when the second aggregation node receives the data packets sent by the at least one core node; and
   sending, by the second aggregation node, the data flow to the second access node according to an ordering of the data packets of the data flow.

5. A data communications network comprising:
a plurality of pods and a core layer, each of the plurality of pods comprising an aggregation layer, the aggregation layer comprising a plurality of aggregation nodes, and the core layer comprising a plurality of core nodes; wherein
a first access node in a first pod is configured to send data packets contained in a first data flow to a first aggregation node in a flow based balancing manner;
the first aggregation node in the first pod is configured to send the data packets of the first data flow to at least one core node in the core layer in a packet based balancing manner;
the at least one core node is configured to receive the data packets of the first data flow, and send the data packets of the first data flow to a second aggregation node in a second pod; and
the second aggregation node is configured to receive the data packets of the first data flow, and sort the data packets of the first data flow to obtain the first data flow.

6. The data communications network according to claim 5, wherein each of the plurality of pods further comprises an access layer comprising a plurality of access nodes,
wherein
a first access node in the first pod is configured to send data packets contained in a second data flow to at least two aggregation nodes in the first pod in a packet based balancing manner, wherein the at least two aggregation nodes comprise the first aggregation node and the second data flow comprises at least two first data flows; and
a second access node in the second pod is configured to receive the at least two first data flows sent by at least two aggregation nodes in the second pod, and sort the at least two first data flows to obtain the second data flow, wherein the at least two aggregation nodes in the second pod comprise the second aggregation node.

7. The data communications network according to claim 6, wherein each data packet of the first and second data flows comprises a first sequence indicator and a second sequence indicator, wherein the first sequence indicator is used to indicate an ordering position of the data packet of the first data flow, and the second sequence indicator is used to indicate an ordering position of the data packet of the second data flow.

8. A data communications network comprising:
a plurality of pods communicatively connected through a core node, each pod comprising an aggregation layer and an access layer, the aggregation layer comprising a plurality of aggregation nodes, and the access layer comprising a plurality of access nodes,
wherein a first access node is configured to determine whether a second access node is in a same pod as the first access node, when the first access node receives from a server a data flow whose destination node is the second access node; and
the first access node is further configured to send, if the second access node is not in the same pod as the first access node, the data flow to a first aggregation node in one pod in a flow based balancing manner; or
the first access node is further configured to send, if the second access node is in the same pod as the first access node, the data flow to aggregation nodes in one pod in a packet based balancing manner;
wherein the first aggregation node is configured to send, when receiving the data flow, data packets contained in the data flow to at least one core node in a core layer in a packet based balancing manner;
the at least one core node is configured to send the received data packets to a second aggregation node in a same pod as the second access node;
the second aggregation node is configured to sort the data packets to obtain the data flow when receiving the data packets sent by the at least one core node; and
the second aggregation node is further configured to send the data flow to the second access node according to an ordering of the data packets of the data flow.

* * * * *